United States Patent
Shimose (10) Patent No.: US 12,442,594 B2
(45) Date of Patent: Oct. 14, 2025

(54) DRYING APPARATUS OF POROUS MATERIAL, HYDROGEN PRODUCTION SYSTEM INCLUDING THE SAME, AND METHOD FOR DRYING POROUS MATERIAL

(71) Applicant: Shimose Microbes Laboratory Corporation, Tokyo (JP)

(72) Inventor: Shinichi Shimose, Tokyo (JP)

(73) Assignee: Shimose Microbes Laboratory Corporation, Tokyo (JP)

( * ) Notice: Subject to any disclaimer, the term of this patent is extended or adjusted under 35 U.S.C. 154(b) by 800 days.

(21) Appl. No.: 17/769,488

(22) PCT Filed: Sep. 14, 2020

(86) PCT No.: PCT/JP2020/034665
§ 371 (c)(1),
(2) Date: Apr. 15, 2022

(87) PCT Pub. No.: WO2021/084942
PCT Pub. Date: May 6, 2021

(65) Prior Publication Data
US 2024/0133625 A1 Apr. 25, 2024
US 2024/0230224 A9 Jul. 11, 2024

(30) Foreign Application Priority Data
Oct. 31, 2019 (JP) .................. 2019-198450

(51) Int. Cl.
*F26B 5/04* (2006.01)
*F26B 11/14* (2006.01)
(Continued)

(52) U.S. Cl.
CPC ............... *F26B 5/04* (2013.01); *F26B 11/14* (2013.01); *F26B 21/06* (2013.01); *F26B 25/006* (2013.01)

(58) Field of Classification Search
None
See application file for complete search history.

(56) References Cited

U.S. PATENT DOCUMENTS

2009/0199425 A1* 8/2009 Taylor .................... C10G 1/006
34/241
2012/0027655 A1* 2/2012 Schaffer .................. C01B 3/501
423/220

(Continued)

FOREIGN PATENT DOCUMENTS

AU 2014202252 A1 11/2014
EP 2455336 A1 5/2012
(Continued)

*Primary Examiner* — David J Laux
(74) *Attorney, Agent, or Firm* — Troutman Pepper Locke LLP (57) ABSTRACT

A drying apparatus of porous material includes a reduced-pressure fermentation dryer configured to: store porous material containing water in an airtight container; heat and stir the porous material under reduced pressure so that a temperature of the porous material is within a predetermined temperature range; feed microorganisms into the airtight container so that the microorganisms enter pores of the porous material; and evaporate the water contained in the porous material by fermentation heat by the microorganisms so as to dry the porous material.

7 Claims, 5 Drawing Sheets

(51) Int. Cl.
    *F26B 21/06*     (2006.01)
    *F26B 25/00*     (2006.01)

(56) References Cited

U.S. PATENT DOCUMENTS

| | | | | |
|---|---|---|---|---|
| 2013/0340322 | A1* | 12/2013 | Knight | C10J 3/62 |
| | | | | 252/372 |
| 2015/0068246 | A1* | 3/2015 | Hakamade | F25J 1/001 |
| | | | | 62/607 |

FOREIGN PATENT DOCUMENTS

| | | | | |
|---|---|---|---|---|
| JP | 2007-319738 | A | | 12/2007 |
| JP | 4153685 | B2 | | 9/2008 |
| JP | 2012-050956 | A | | 3/2012 |
| JP | 2014-214257 | A | | 11/2014 |
| JP | 2014228265 | A | * | 12/2014 |
| WO | 2011/007493 | A1 | | 1/2011 |
| WO | 2011/129192 | A1 | | 10/2011 |

* cited by examiner

DRYING APPARATUS OF POROUS MATERIAL, HYDROGEN PRODUCTION SYSTEM INCLUDING THE SAME, AND METHOD FOR DRYING POROUS MATERIAL

TECHNICAL FIELD

The present invention relates to a drying apparatus of porous material such as lignite and activated carbon, a hydrogen production system including the drying apparatus, and a method for drying porous material.

BACKGROUND ART

Conventionally, lignite as porous material has a low carbon content while containing a large amount of water. Thus, the lignite has low power generation efficiency in comparison with bituminous coal used for thermal power generation. For this reason, the lignite is used for power generation only in the vicinity of coal mines. However, nowadays, a technique is being developed for producing hydrogen by gasifying the lignite. In the hydrogen production technology, the lignite is dried in advance in order to be fed into the gasification furnace. Examples of the conventional drying treatment of the lignite include hot-air drying and drying using a carbonization apparatus.

However, when the lignite is subjected to hot-air drying taking into account not causing combustion of the lignite, it occurs frequently that only the surface part of the lignite is dried but the central part thereof is not sufficiently dried. Also, when the carbonization apparatus is used for drying, combustion gas is generated.

The applicant of the present invention has already filed a patent application related to a reduced-pressure fermentation dryer as described, for example, in Patent Document 1 below, which is configured to: store organic waste in an airtight container such as a tank; heat and stir the content under reduced pressure so that the temperature of the waste is within a predetermined temperature range in order to dry the waste by efficiently evaporating water; and promote fermentation of organic matter contained in the organic waste to be treated by adding prescribed microorganisms thereto.

PRIOR ART DOCUMENTS

Patent Documents

[Patent Document 1] JP 2007-319738 A
[Patent Document 2] JP 4153685

SUMMARY OF THE INVENTION

Problem to be Solved by the Invention

The present invention was made in consideration of the above circumstances, an object of which is to provide a drying apparatus of porous material that can dry porous material containing a large amount of water such as lignite sufficiently to its central part without generating combustion gas, and also to provide a hydrogen production system using the above drying apparatus and furthermore a method for drying the porous material.

Means for Solving the Problem

The present invention has a following configuration as means for solving the above problem. That is, a drying apparatus of porous material of the present invention includes a reduced-pressure fermentation dryer configured to: store porous material containing water in an airtight container; heat and stir the porous material under reduced pressure so that a temperature of the porous material is within a predetermined temperature range; feed microorganisms into the airtight container so that the microorganisms enter pores of the porous material; and evaporate the water contained in the porous material by fermentation heat by the microorganisms so as to dry the porous material.

With the present invention, while the porous material is being stirred in the airtight container of the reduced-pressure fermentation dryer, fermentation is initially performed in the state in which the microorganisms enter a large number of pores of the surface part of the porous material, which causes evaporation of water that exists around the pores by the fermentation heat. Further, the microorganisms enter pores located further inside with respect to the surface part of the porous material and perform fermentation to cause evaporation of water that exists around the pores by the fermentation heat. This process is repeatedly preformed, and finally, the water in the central part of the porous material is evaporated by the fermentation heat by the microorganisms. Thus, it is possible to dry the porous material sufficiently to the central part without generating combustion gas as in the conventional cases.

In the present invention, it is preferable that the porous material is lignite. With this configuration, it is possible to obtain lignite dried sufficiently to the central part thereof as material for producing hydrogen.

A hydrogen production system of the present invention includes: the drying apparatus of lignite as porous material; and a gasifier that gasifies the lignite dried by the reduced-pressure fermentation dryer of the drying apparatus so as to generate gas containing carbon monoxide and hydrogen as main components.

With the present invention, since the lignite dried sufficiently to the central part contains almost no water and thus has a high calorific value, it has a high temperature when it is heated. Therefore, it is possible to efficiently gasify the lignite and to reliably generate, from the lignite, mixed gas containing carbon monoxide and hydrogen.

In the present invention, it is preferable that the hydrogen production system further includes a gas purifier that removes impurities contained in the gas generated by the gasifier. Also, it is preferable that the hydrogen production system further includes a carbon dioxide separation apparatus that generates carbon dioxide by a shift reaction of carbon monoxide in the gas from which the impurities are removed by the gas purifier so as to separate the carbon dioxide from the hydrogen. With the above configuration, it is possible to reliably extract hydrogen from the gas containing carbon monoxide and hydrogen.

In the present invention, it is preferable that the hydrogen production system further includes storage equipment that stores liquid hydrogen obtained by liquefying the hydrogen separated from the carbon dioxide by the carbon dioxide separation apparatus. With this configuration in which the produced hydrogen is stored as liquid hydrogen, it is possible to store hydrogen efficiently in relatively small equipment.

In the present invention, it is preferable that the carbon dioxide separated by the carbon dioxide separation apparatus is injected in underground strata or undersea strata. With this configuration, the carbon dioxide separated at the time of producing hydrogen from the lignite is injected in the depleted oil field strata or the depleted gas field strata. Thus, it is possible to efficiently use the carbon dioxide, which results in discharge of substantially no carbon dioxide.

In the present invention, it is preferable that the hydrogen production system further includes transportation to transport the liquid hydrogen stored in the storage equipment to a predetermined site. With this configuration, it is possible to transport the liquid hydrogen to a region or a country located away from the lignite mining site so that the liquid hydrogen is used in the region or the country to produce, for example, fuel cells.

A method for drying porous material of the present invention includes reduced-pressure fermentation drying steps of: storing porous material containing water in an airtight container; heating and stirring the porous material under reduced pressure so that a temperature of the porous material is within a predetermined temperature range; feeding microorganisms into the airtight container so that the microorganisms enter pores of the porous material; and evaporating the water contained in the porous material by fermentation heat by the microorganisms so as to dry the porous material. With this method, it is possible to expect the same effects as those obtained by the drying apparatus of porous material as described above.

Effects of the Invention

With the drying apparatus of porous material, the hydrogen production system including the drying apparatus, and the method for drying the porous material of the present invention, it is possible to obtain porous material dried sufficiently to its central part using fermentation heat by microorganisms. Furthermore, when the porous material is lignite, the lignite dried sufficiently to its central part has a high temperature when it is heated, which causes a higher rate of gasification reaction. Therefore, it is possible to produce hydrogen effectively, and thus it is possible to produce fuel cells using the thus produced hydrogen.

BRIEF DESCRIPTION OF THE DRAWINGS

FIG. 3(*a*) illustrates a state before subjected to the drying treatment. FIG. 3(*b*) is a state in which only the surface part of the lignite is dried. FIG. 3(*c*) illustrates a state in which the lignite is dried from the surface part to the substantially halfway point to the central part. FIG. 3(*d*) illustrates a state in which the lignite is dried to the vicinity of the central part. FIG. 3(*e*) illustrates a state in which the lignite is dried to the central part. FIG. 3(*f*) illustrates a state in which the lignite is sufficiently dried and pulverized so as to be pulverized coal. FIG. 3(*g*) illustrates a state in which the pulverized coal is more finely pulverized, finally, so as to be fine pulverized coal.

FIG. 5(*a*) illustrates a state before subjected to the drying treatment. FIG. 5(*b*) illustrates a state after the drying treatment is finished.

MODE FOR CARRYING OUT THE INVENTION

Hereinafter, an embodiment of the present invention will be described with reference to the drawings.

Figure 1:
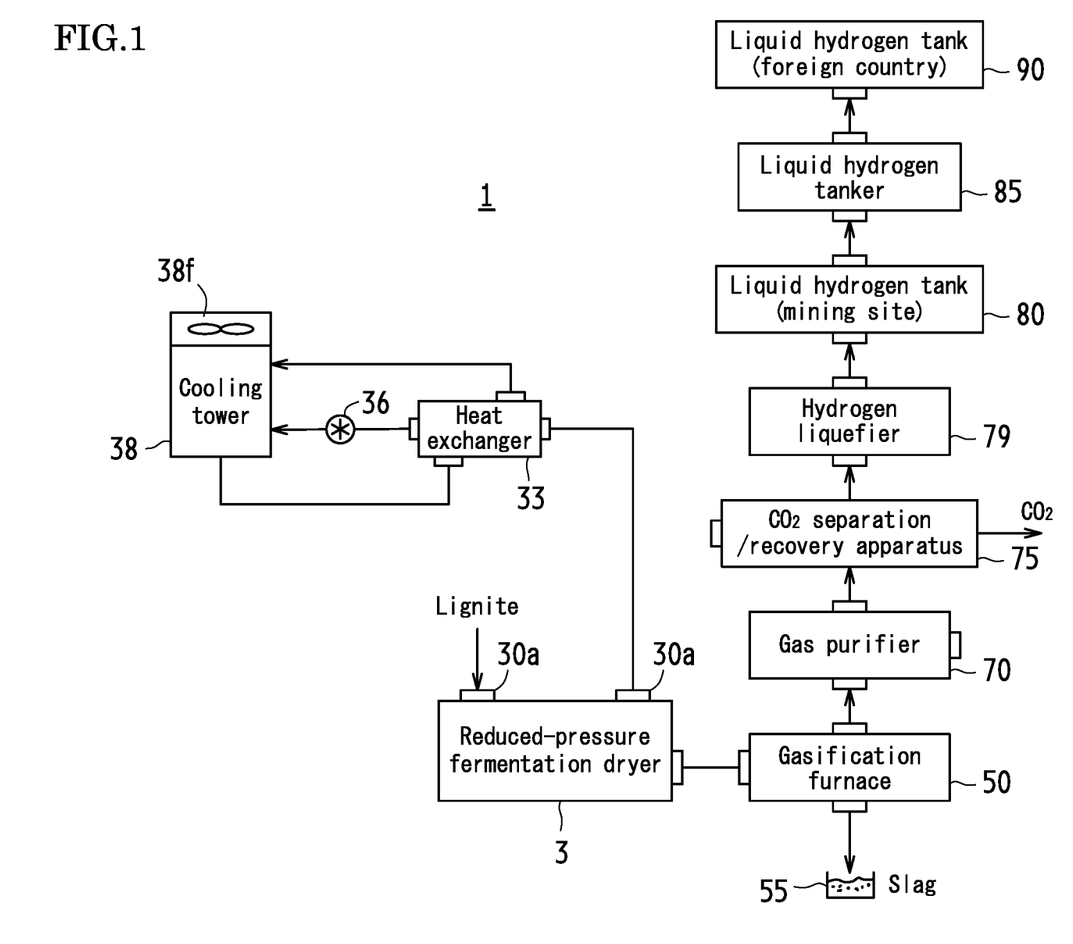
FIG. 1 is a block diagram indicating an overall configuration of a hydrogen production system including a reduced-pressure fermentation dryer as a drying apparatus of lignite.

FIG. 1 is a block diagram indicating an overall configuration of a hydrogen production system including a reduced-pressure fermentation dryer as a drying apparatus of lignite.

A hydrogen production system 1 as shown in FIG. 1 includes a reduced-pressure fermentation dryer 3 to dry lignite that is porous material as a source of hydrogen.

<Reduced-Pressure Fermentation Dryer>

As shown in FIG. 1, lignite as porous material is fed, from a feeding hole 30*a*, into the inside of the reduced-pressure fermentation dryer 3. The lignite supplied from the feeding hole 30*a* has a low degree of coalification and a low carbon content while having a high water content of 30 to 60%, compared to bituminous coal. Thus, the lignite has low power generation efficiency, which is likely to remain as unused resources.

The configuration of the reduced-pressure fermentation dryer 3 is publicly known as exemplarily described in Patent Document 1. That is, the reduced-pressure fermentation dryer 3 is configured to: heat and stir an object to be treated under reduced pressure so that a temperature of the object to be treated is within a predetermined temperature range; dry the object to be treated by fermentation by microorganisms; and obtain a volume-reduced dried product.

Figure 2:
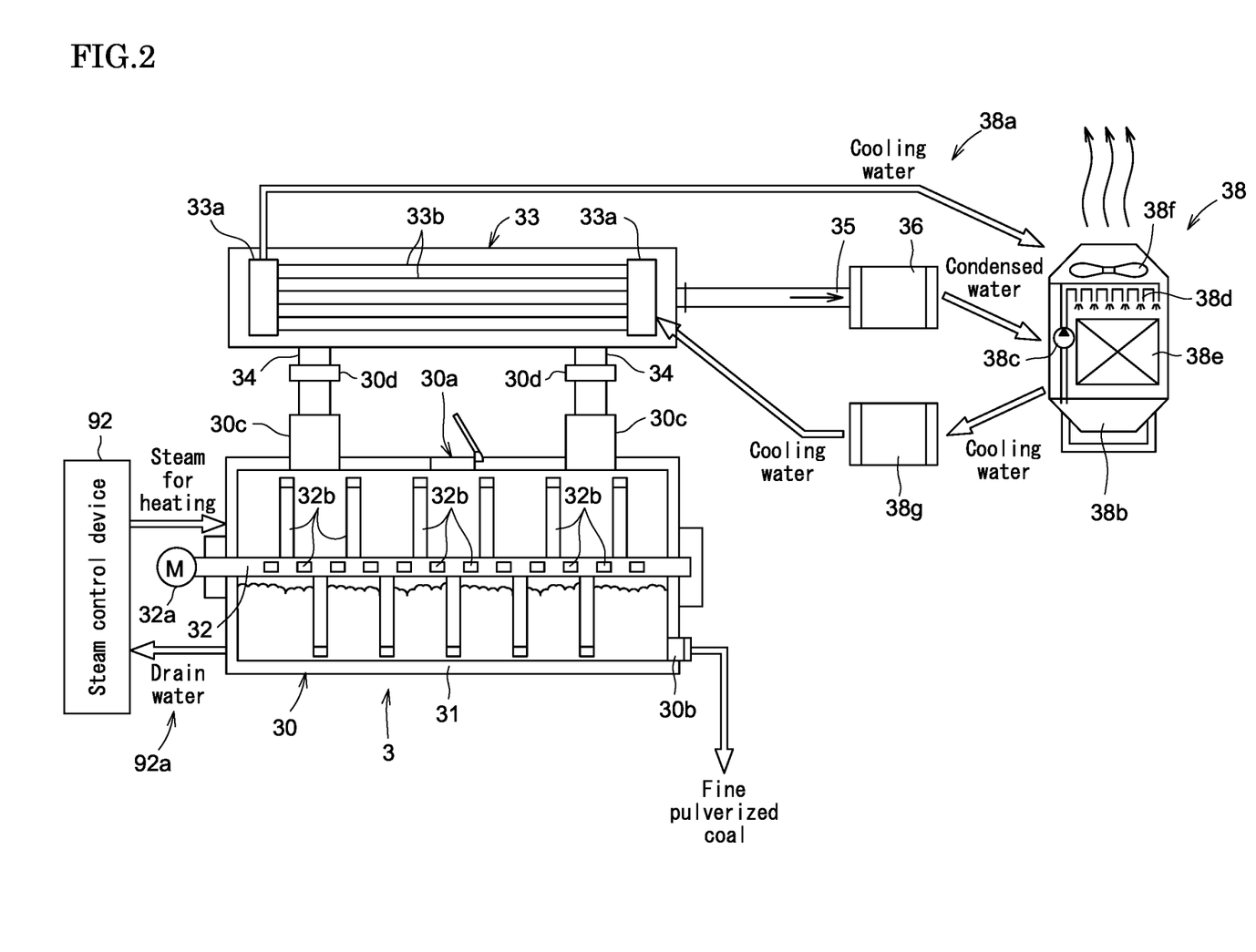
FIG. 2 is a diagram schematically illustrating a configuration of the reduced-pressure fermentation dryer.

Specifically, as schematically shown in FIG. 2, the reduced-pressure fermentation dryer 3 includes a substantially cylinder-shaped tank 30 formed to have airtightness such that the pressure inside the tank 30 is maintained equal to or lower than the atmospheric pressure. The tank 30 serves as an airtight container that stores the lignite that is porous material as the object to be treated fed through the feeding hole 30*a*. A heating jacket 31 is provided on a peripheral wall part of the tank 30. Steam for heating is supplied to the heating jacket 31 from a steam control device 92. The steam for heating via a steam circulation path 92*a* circulates in the heating jacket 31, and is collected by the steam control device 92 as drain water. A preferable example of the temperature of the steam supplied from the steam control device 92 is about 140° C.

In the tank 30, a stirring shaft 32 is disposed so as to extend in the longitudinal direction (left and right direction in FIG. 2) while it is surrounded by the heating jacket 31. The stirring shaft 32 is rotated by an electric motor 32*a* at a predetermined rotational speed. The stirring shaft 32 includes a plurality of stirring blades 32*b* that is separated from each other in the shaft direction. The stirring blades 32*b* stir the lignite so that a dried product (a fine pulverized coal 48 described later) obtained by fermenting and drying the lignite is transported in the longitudinal direction of the tank 30.

The feeding hole 30*a* for the lignite is provided in an upper part on the side in the longitudinal direction of the tank 30. The lignite that is fed through the feeding hole 30*a* is heated by the heating jacket 31 while stirred by the rotation of the stirring shaft 32. After elapse of a predetermined period of time, the dried product (the fine pulverized coal 48) after treatment is discharged from a discharge port 30*b* provided in a lower part of the tank 30. In place of the electric motor 32*a*, a hydraulic motor may be used.

On the upper part of the tank 30, a guiding section 30*c*, which guides steam generated from the heated lignite to a condensing section 33, is provided so as to protrude from the tank 30. In this embodiment, two guiding sections 30*c* are provided so as to be separated from each other at a predetermined distance in the longitudinal direction of the tank 30. The condensing section 33 is supported by connection paths 34 via the guiding sections 30c. In the condensing section 33, a plurality of cooling tubes 33b is provided so as to be held by a pair of heads 33a. A cooling channel 38a is provided between the plurality of cooling tubes 33b and a cooling tower 38. In this embodiment, the condensing section 33 extends parallel to the longitudinal direction of the tank 30, and is provided backward the guiding sections 30c.

In the condensing section 33, the temperature of cooling water is increased by heat exchange with hot steam during passing through the cooling tubes 33b. The cooling water with increased temperature passes through the cooling channel 38a to flow into a water receiving tank 38b of the cooling tower 38, as schematically shown by the arrow in FIG. 2. The cooling tower 38 includes: a drawing pump 38c that draws the cooling water from the water receiving tank 38b; and a nozzle 38d that sprays the drawn cooling water. The cooling water sprayed from the nozzle 38d flows downward through a downward flowing section 38e with being blown by a fan 38f, which lowers the temperature of the cooling water. Then, the cooling water flows again into the water receiving tank 38b.

The cooling water cooled by the cooling tower 38 is transported by a cooling water pump 38g and is supplied to the condensing section 33 via the cooling channel 38a. During passing through the plurality of cooling tubes 33b, the temperature of the cooling water is increased by heat exchange with steam generated in the tank 30 as described above. After that, the cooling water once again flows into the water receiving tank 38b of the cooling tower 38 via the cooling channel 38a. That is, the cooling water circulates through the cooling channel 38a between the condensing section 33 and the cooling tower 38.

Apart from the cooling water that circulates as described above, condensed water also flows into the cooling tower 38, which is condensed from the steam generated from the heated lignite in the condensing section 33. Although it is omitted from the drawings, the condensed water generated by the heat exchange with the hot steam is gathered in a bottom part of the condensing section 33.

A vacuum pump 36 is connected to the condensing section 33 via a communication path 35 so as to reduce the pressure in the tank 30. Thus, when the vacuum pump 36 operates, air and condensed water are sucked from the condensing section 33 via the communication path 35, and furthermore air and steam in the tank 30 are sucked via the communication paths 34 and the guiding sections 30c. Accordingly, the condensed water is sucked from the condensing section 33 by the vacuum pump 36, and guided from the vacuum pump 36 to the water receiving tank 38b of the cooling tower 38 via a water conduit. An on-off valve 30d is provided on each communication path 34, which prevents air and the like from being sucked from the reduced-pressure fermentation dryer 3 when it is stopped. Although it is omitted from the drawings, an atmosphere opening valve is disposed in the vicinity of the vacuum pump 36 so that the inside of the tank 30 is opened to the outside.

Then, the condensed water introduced in the water receiving tank 38b of the cooling tower 38 is mixed with the cooling water. The mixed cooling water is drawn, as described above, by the drawing pump 38c so as to be sprayed by the nozzle 38d. After being sprayed, the cooling water flows downward through the downward flowing section 38e while being cooled. Since the condensed water contains the same microorganisms as those added to the lignite in the tank 30, an odor component or the like contained in the condensed water has been decomposed. Thus, the odor of the air is not diffused outside the tank 30.

Here, operations of the reduced-pressure fermentation dryer 3 having the above-described configuration are described. The lignite stored in the tank 30, to which are added the microorganisms as described later, is heated by the steam for heating that is supplied to the heating jacket 31 while being stirred by the rotation of the stirring shaft 32. The lignite is heated from the outside by the heating jacket 31 surrounding the inside of the tank 30 as well as heated from the inside by the stirring shaft 32 and the like. Thus, the temperature of the lignite stored in the tank 30 is effectively increased while the lignite is stirred by the stirring shaft 32. In association with the stir of the lignite, the added microorganisms enter pores of the lignite and ferment organic matter, died microorganisms (organic matter) and part of water that are contained in the lignite as nutrient. Since the water contained in the lignite is repeatedly evaporated by the fermentation heat, the lignite is dried sufficiently to the central part thereof. In addition to the above, since the pressure in the tank 30 is reduced due to operations of the vacuum pump 36, the boiling point is reduced in the tank 30. As a result, the evaporation of water contained in the lignite by the fermentation heat is accelerated and thus drying of the lignite is advanced. The lignite dried sufficiently to the central part thereof contains almost no water, which is a dried product having a high calorific value and thus having a high temperature when it is heated.

It is preferable that the reduced-pressure fermentation drying treatment by the reduced-pressure fermentation dryer 3 takes, for example, 3 hours as one process (one cycle). First, the lignite is fed for 30 minutes. Then, the fermentation step and the drying step are performed simultaneously for 2 hours. In the fermentation step, fermentation is caused by the microorganisms passing through the pores of the lignite, and in the drying step, the lignite is dried to its central part by the fermentation heat by the microorganisms. During the fermentation step and the drying step, the lignite is pulverized by the stirring blades 32b, and furthermore the pulverized pieces of lignite collide with each other to be finely pulverized. Then, the fine pulverized coal is discharged from the discharge port 30b for 30 minutes. During this cycle, the inside of the tank 30 is decompressed to −0.06 to −0.07 MPa (gauge pressure, hereinafter this unit name is omitted), so that the water temperature inside the tank 30 is maintained at 76 to 69° C. (saturated steam temperature). In this range of temperature, activity of the microorganisms is promoted. As a result, the fermentation and drying of the lignite are promoted by the microorganisms described later. As to the microorganisms added to the lignite in the tank 30 at the time of fermentation and drying steps, it is preferable to use complex effective microorganisms, which are cultured in advance using a plurality of kinds of native microorganisms as a base, as described, for example, in Patent Document 2. That is, groups of so-called SHIMOSE 1, SHIMOSE 2 and SHIMOSE 3 have the majority of the colony.

Here, SHIMOSE 1 has the accession number FERM BP-7504 (internationally deposited with the Patent Microorganisms Depository of the National Institute of Advanced Industrial Science and Technology and the National Institute of Bioscience and Human-Technology of the Ministry of Economy, Trade and Industry (1-1-3 Higashi, Tsukuba, Ibaraki, Japan) on Mar. 14, 2003). Also, SHIMOSE 2 has the accession number FERM BP-7505 (internationally deposited in the same manner as SHIMOSE 1), which is a microorganism belonging to the genus Pichiafarinosa having salt tolerance. SHIMOSE 3 has the accession number FERM BP-7506 (internationally deposited in the same manner as SHIMOSE 1), which is a microorganism belonging to the genus Staphylococcus.

Here, a description is given on how to proceed with the reduced-pressure fermentation drying of the lignite (i.e. the reduced-pressure fermentation drying steps) by the reduced-pressure fermentation dryer 3.

First, the lignite is fed into the feeding hole 30a of the tank 30 of the reduced-pressure fermentation dryer 3. Then, the tank 30 is sealed so that the inside of the tank 30 is kept at the atmospheric pressure.

After adding the prescribed microorganisms to the lignite in the tank 30, the tank 30 is sealed by closing an atmosphere opening valve disposed in the vicinity of the vacuum pump 36. Thus, the inside of the tank 30 is heated under reduced pressure by the steam for heating that is supplied from the steam control device 92 described later.

More specifically, the inside of the tank 30 is heated by the steam for heating and the stirring shaft 32 is rotated at a predetermined rotational speed (for example, about 8 rpm) to stir the lignite, while the pressure in the tank 30 is reduced by operating the vacuum pump 36. Thus, the temperature inside the tank 30 is optimized for microbial activity. As a result, decomposition of the organic matter is effectively promoted by the microorganisms. Here, the rotational speed (8 rpm) of the stirring shaft 32 is shown as an example, and any other rotational speed may be adopted to the extent that the organic matter can be decomposed.

Thus, in the tank 30 under reduced pressure, the microorganisms enter pores of the lignite and perform fermentation in association with the stir of the lignite. Since the water contained in the lignite is repeatedly evaporated by the fermentation heat, the lignite is dried. Hereinafter, the fermentation progress is described referring to FIG. 3.

Figure 3:
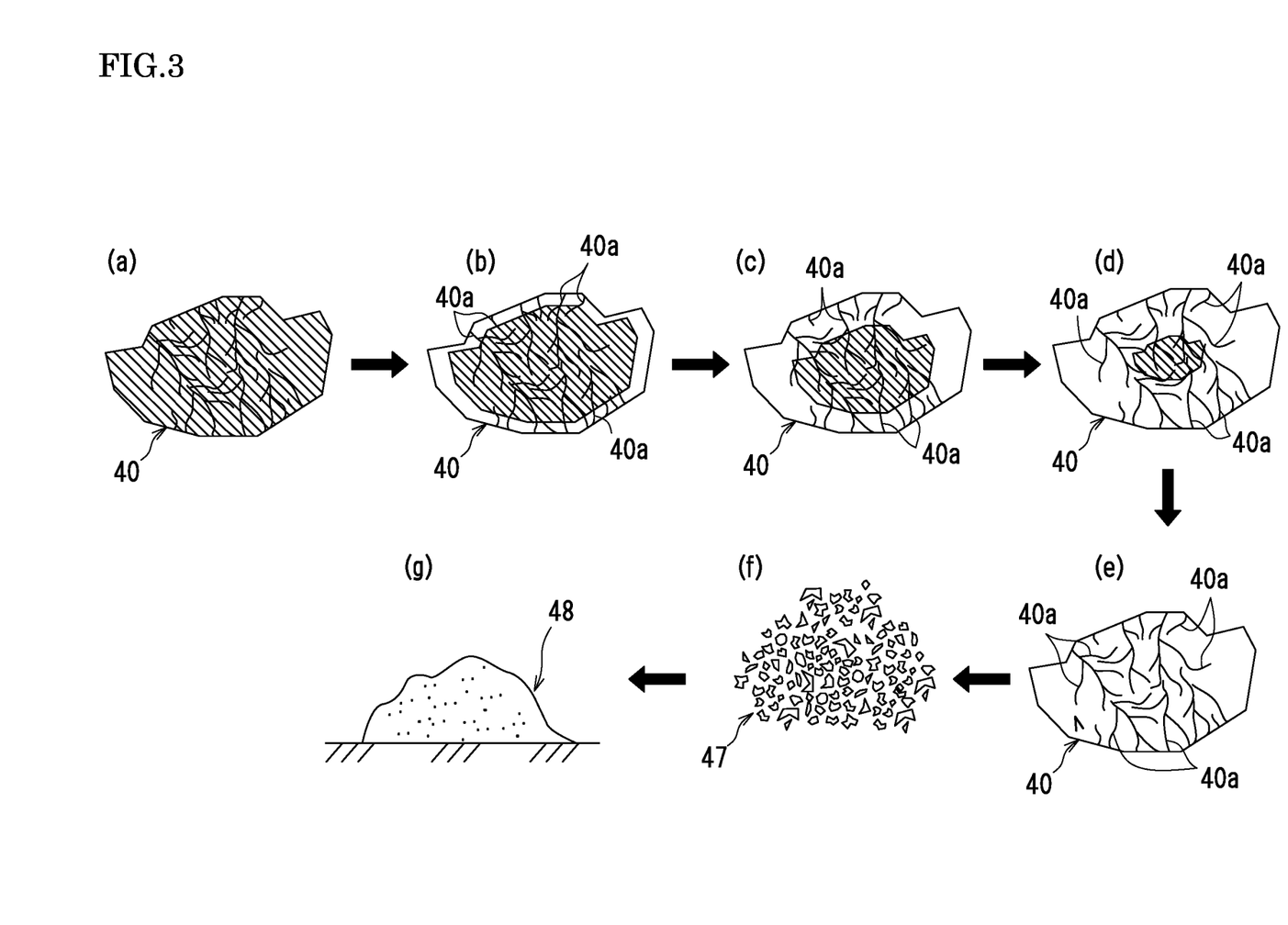
FIG. 3 are diagrams illustrating each drying degree of the lignite when the lignite is dried using the reduced-pressure fermentation dryer.

In FIGS. 3, FIG. 3(a) illustrates lignite 40 before it is fed. In FIGS. 3, water contained in the lignite 40 is shown by the hatched lines, and thus in FIG. 3(a), the water is distributed throughout the lignite 40. In FIG. 3(b), the microorganisms enter pores 40a in the surface part of the lignite 40 and metabolize and ferment organic matter of the lignite 40 and part of water existing in the vicinity as nutrient so as to evaporate the water contained in the surface part of the lignite 40 by the fermentation heat. Although the pores 40a are only schematically shown in FIGS. 3, there exist innumerable pores 40a actually inside the lignite 40. In FIG. 3(c), the microorganisms further go into the pores 40a from the surface part of the lignite 40 toward the central part and metabolize and ferment organic matter, died microorganisms (organic matter) of the lignite 40 and part of water existing in the vicinity as nutrient so as to evaporate the water contained in the part more interior than the surface part (i.e. further inside toward the central part) of the lignite 40 by the fermentation heat. Thus, the lignite 40 is dried from the surface part to the substantially halfway point to the central part. In FIG. 3(d), the microorganisms further go into the pores 40a and arrive in the vicinity of the central part of the lignite 40. In the vicinity of the central part, the microorganisms metabolize and ferment organic matter, died microorganisms of the lignite 40 and part of water existing in the vicinity as nutrient so as to evaporate the water contained in the vicinity of the central part of the lignite 40 by the fermentation heat. In FIG. 3(e), the microorganisms further go into the pores 40a and perform metabolism and fermentation in the same way as described above in the central part of the lignite 40 so as to evaporate the water contained in the central part of the lignite 40 by the fermentation heat. In this way, substantially whole of the water contained in the lignite 40 is evaporated so that the lignite 40 is left in the entirely dried state. In this state, the fermentation by the microorganisms is stopped. In FIG. 3(f), since the lignite 40 is dried to its central part and thus becomes brittle, the lignite 40 is easily pulverized by being stirred by the stirring shaft 32 so as to be pulverized coal 47. Furthermore in FIG. 3(g), the pulverized pieces of pulverized coal 47 collide with each other so as to be further finely pulverized as fine pulverized coal 48. The particle diameter of the fine pulverized coal 48 is, for example, not more than 0.1 mm. Also, since the fine pulverized coal 48 is modified from the lignite 40 due to fermentation by the microorganisms, the quality of the fine pulverized coal 48 is higher than bituminous coal.

As described above, when the lignite 40 is fed into the tank 30, the microorganisms enter the pores 40a from the surface part of the lignite 40. The microorganisms continue to go into the lignite toward the central part while performing fermentation. Thus, the water contained in the lignite 40 is evaporated by the fermentation heat successively from the surface part to the central part, repeatedly. Finally, the water is evaporated sufficiently to the central part of the lignite 40 so that the lignite 40 is dried, thus the fine pulverized coal 48 finely pulverized is obtained.

When a predetermined period of time is elapsed in the state in which the temperature and the pressure in the tank 30 are maintained and the supplied lignite 40 is dried to its central part and finely pulverized to be the fine pulverized coal 48, then the vacuum pump 36 and the supply of steam for heating from the steam control device 92 are stopped, while the atmosphere opening valve is opened, so that the pressure inside the tank 30 becomes the atmospheric pressure. Furthermore, the stirring shaft 32 is reversely rotated and the lid of the discharge port 30b of the tank 30 is opened so as to discharge the dried product, i.e. the lignite dried sufficiently to its central part and finely pulverized (fine pulverized coal 48) from the tank 30.

<Hydrogen Production System>

In the hydrogen production system 1 shown in FIG. 1, the fine pulverized coal 48 obtained by the reduced-pressure fermentation dryer 3 is supplied to the gasification furnace (gasifier) 50.

Figure 4:
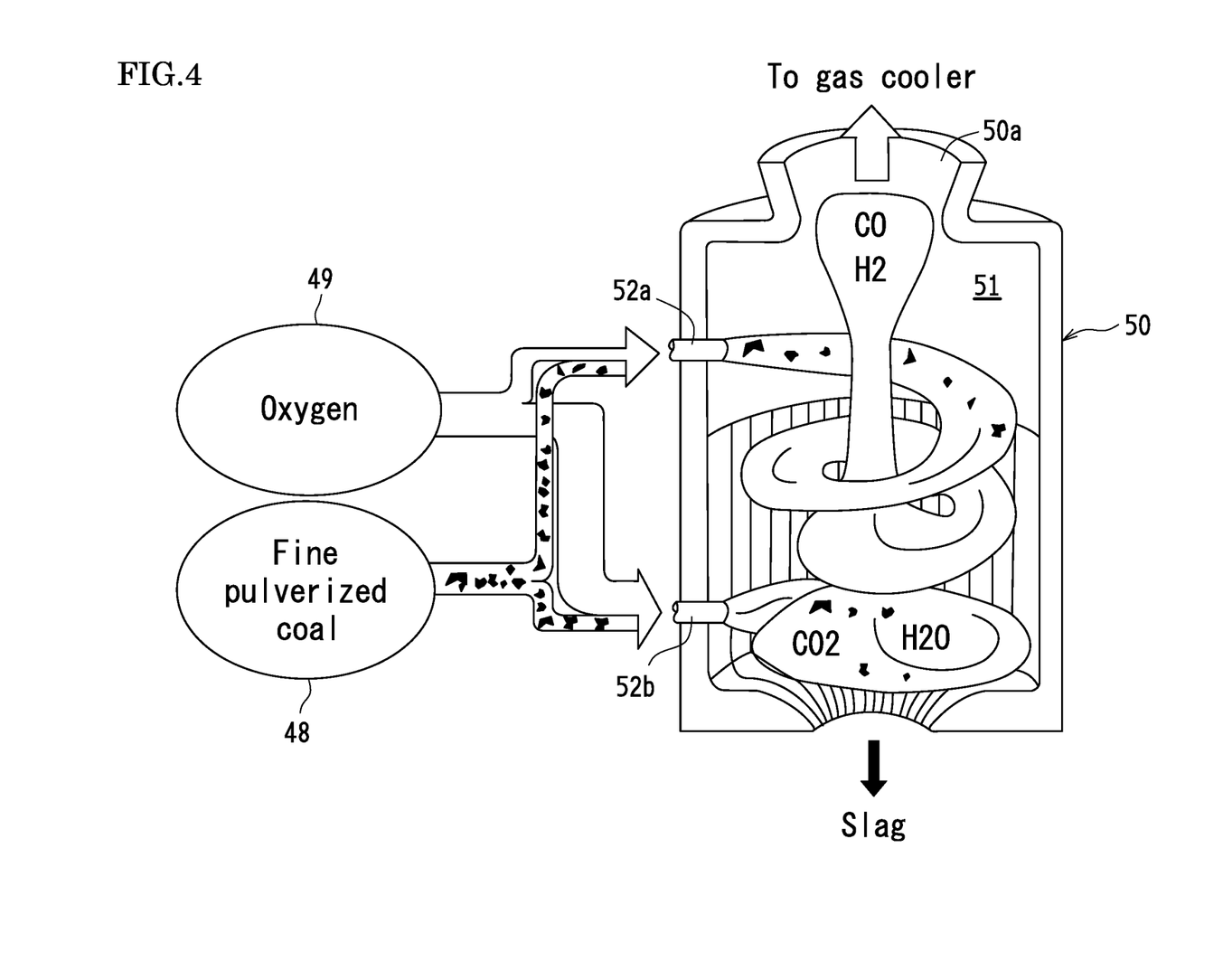
FIG. 4 is a diagram schematically illustrating a configuration of a gasification furnace included in the hydrogen production system and its surroundings.

An internal configuration of the gasification furnace 50 is indicated in FIG. 4. FIG. 4 is a schematic configuration diagram conceptually showing the inside of the gasification furnace 50. In FIG. 4, the gasification furnace 50 includes a gasification chamber 51 in the inside thereof. On one side part of the gasification chamber 51, an upper burner 52a is provided on the upper part thereof, and a lower burner 52b is provided on the lower part thereof. These burners 52a and 52b are provided as a two stage construction, that is, the fine pulverized coal 48 and oxygen 49 as oxidizing agent (gasifying agent) are both supplied to each of the burners 52a and 52b. The gasification furnace 50 has an entrained bed structure, and thus, the fine pulverized coal 48 and the oxygen 49 are supplied to each of the upper and lower burners 52a and 52b, to which swirl flow is applied in the gasification chamber 51 to be heated. The fine pulverized coal 48 has a long residence time in the gasification chamber 51 because of the swirl flow, which promotes gasification reaction to obtain high gasification efficiency.

As to the ratio of oxygen supplied to the upper burner 52a to oxygen supplied to the lower burner 52b in the gasification furnace 50, the amount of oxygen supplied to the upper burner 52a is smaller than the amount of oxygen supplied to the lower burner 52b. In this way, the upper part in the gasification chamber 51 has a high temperature (for example, about 1600° C.) while the lower part in the gasification chamber 51 has a slightly low temperature (for example, about 1200° C.). As a result, in the lower part of the gasification chamber 51, gas containing carbon dioxide ($CO_2$) and steam ($H_2O$) is generated by the reaction of the fine pulverized coal 48 and the oxygen (gasifying agent) 49. On the other hand, in the upper part of the gasification chamber 51, the fine pulverized coal 48 and the oxygen (gasifying agent) 49 are supplied and combusted, and further are heated so as to have a high temperature. At this high temperature, the carbon dioxide ($CO_2$) and the steam ($H_2O$), which are generated in the lower part of the gasification chamber 51 and rise to the upper part of the gasification chamber 51, are thermally decomposed. Thus, gas containing carbon monoxide (CO) and hydrogen ($H_2$) is generated. The carbon monoxide (CO) and the hydrogen ($H_2$) in the generated gas ride the upward flow and drawn out upward from an outlet 50a provided in the upper end part so as to be cooled by a gas cooler (not shown). Also, generated slag is discharged from the lower end part so as to be stored in a discharge container 55 (see FIG. 1).

The gas that contains carbon the monoxide (CO) and the hydrogen ($H_2$), which is generated in the gasification furnace 50, is drawn out from the outlet 50a and supplied to the gas cooler so as to be cooled. After that, the cooled gas is supplied to a gas purifier 70. The gas purifier 70 removes impurities other than the main components in the generated gas. For example, the gas purifier 70 removes sulfur compounds (such as hydrogen sulfide ($H_2S$) and carbonyl sulfide (COS)). Specifically, the gas purifier 70 for removing hydrogen sulfide ($H_2S$) has principally a COS converter and a $H_2S$ absorber, although they are not shown in the drawings. The COS converter converts, by catalytic reaction, carbonyl sulfide (COS) into hydrogen sulfide ($H_2S$). Also, the $H_2S$ absorber stores alkaline solution such as amine solution as absorbing solution, and absorbs hydrogen sulfide ($H_2S$) by passing the generated gas through the alkaline solution. The other configurations are omitted as they are well known.

The gas from which the impurities are removed is supplied to a $CO_2$ separation/recovery apparatus 75. The $CO_2$ separation/recovery apparatus (carbon dioxide separation apparatus) 75 causes shift reaction to form carbon dioxide ($CO_2$) from the carbon monoxide (CO) from which the impurities are removed. Then, the $CO_2$ separation/recovery apparatus 75 separates and recovers the carbon dioxide ($CO_2$) from the gas. The $CO_2$ separation/recovery apparatus 75 adopts a membrane separation method in which the carbon dioxide ($CO_2$) and the hydrogen ($H_2$) are separated from each other by ceramic membrane or the like.

Furthermore, the $CO_2$ separation/recovery apparatus 75 is connected to a pipeline (not shown). The pipeline is passed through underground or undersea to reach depleted oil field strata or depleted gas field strata. Thus, the separated carbon dioxide ($CO_2$) as described above is transported to the oil field or the gas field so as to be injected in the oil field strata or the gas field strata. In addition, such feeding of carbon dioxide ($CO_2$) allows a revived oil field or a revived gas field to supply again oil or gas.

As described above, the $CO_2$ separation/recovery apparatus 75 obtains only the hydrogen ($H_2$) by separating and recovering the carbon dioxide (COD, and supplies the obtained hydrogen ($H_2$) to a hydrogen liquefier 79. The hydrogen liquefier 79 liquefies the supplied hydrogen ($H_2$) to convert it into liquid hydrogen ($LH_2$) so as to store the liquid hydrogen ($LH_2$) in a liquid hydrogen tank (mining site) 80 at the lignite mining site. The liquid hydrogen tank (mining site) (i.e. storage equipment) 80 has good thermal insulation performance that prevents evaporation of the liquid hydrogen ($LH_2$). The volume efficiency of the liquid hydrogen ($LH_2$) is several hundred times higher than the hydrogen ($H_2$) in the atmospheric pressure. Therefore, it is possible to store the hydrogen ($H_2$) in relatively small equipment by storing the liquid hydrogen ($LH_2$) converted from the hydrogen ($H_2$) in the liquid hydrogen tank (mining site) 80.

The liquid hydrogen ($LH_2$) stored in the liquid hydrogen tank (mining site) 80 is transported by a liquid hydrogen tanker 85. The liquid hydrogen tanker (transportation) 85 transports the liquid hydrogen ($LH_2$) to another region or country across the sea. For example, when lignite is extracted from a coal mining site in a certain country, hydrogen ($H_2$) is produced from the lignite using the hydrogen production system 1 in the certain country, and is stored in the liquid hydrogen tank (mining site) 80. Then, the liquid hydrogen ($LH_2$) in the hydrogen tank (mining site) 80 is transported, by the liquid hydrogen tanker 85, to another country where the produced hydrogen ($H_2$) is used. When the liquid hydrogen ($LH_2$) is transported from land to land in the certain country, a vehicle is used in place of the liquid hydrogen tanker 85.

The liquid hydrogen ($LH_2$) that is transported by the liquid hydrogen tanker 85 is stored, for example, in a liquid hydrogen tank (foreign country) 90 that is provided in another country, which is different from the country where the lignite mining site is located. The liquid hydrogen ($LH_2$) stored in the liquid hydrogen tank (foreign country) 90 is transported, as necessary, to a predetermined site so as to produce fuel cells or the like.

Figure 5:
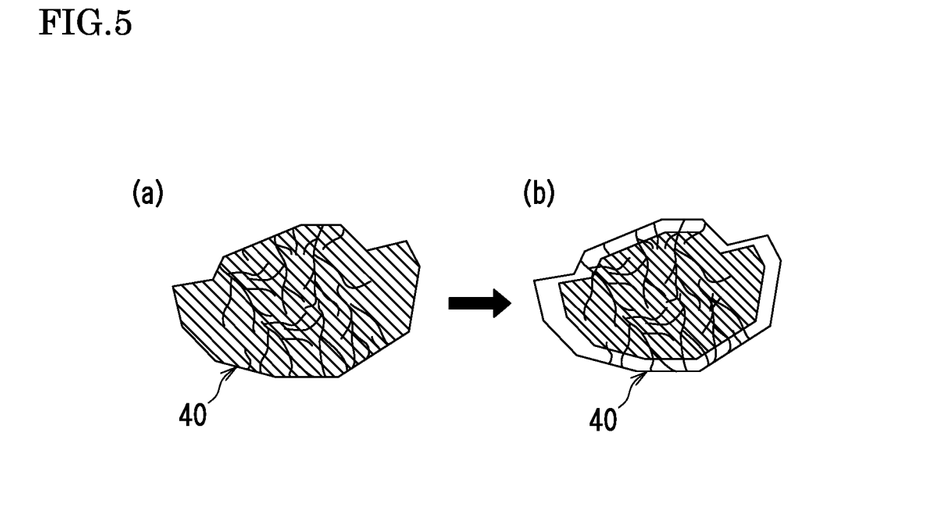
FIG. 5 are diagrams illustrating each drying degree of the lignite when the lignite is dried by the conventional method.

In this embodiment as described above, the lignite 40 is used as the porous material. The lignite 40 is fed into the tank 30 of the reduced-pressure fermentation dryer 3 so that the microorganisms enter the pores of the lignite 40 while the lignite 40 is stirred in the tank 30. Thus, the lignite 40 is dried sufficiently to the central part thereof by the fermentation heat by the microorganisms, and the fine pulverized coal 48 finely pulverized is obtained. In the conventional cases, when the lignite 40 before drying treatment as shown in FIG. 5(*a*) is subjected to hot-air drying, the lignite 40 is combusted. When the lignite 40 is dried while being prevented from combusting, only the surface part of the lignite 40 is dried and a large amount of water still exists in the central part inside the surface part, as shown in FIG. 5(*b*). Also, when the lignite 40 is dried by the carbonization apparatus, combustion gas is generated. Therefore, in this embodiment, it is possible to obtain the lignite 40 (fine pulverized coal 48) dried sufficiently to the central part by the fermentation heat by the microorganisms and finely pulverized without generating combustion gas unlike the conventional cases.

Also, the above fine pulverized coal 48 is supplied to the gasification furnace 50 of the hydrogen production system 1 so as to be gasified. At the time of gasification, since the fine pulverized coal 48 containing almost no water has a high calorific value, the fine pulverized coal 48 has a high temperature when it is heated. Therefore, the reaction rate to convert the fine pulverized coal 48 into gas that contains carbon monoxide (CO) and hydrogen ($H_2$) as main components is promoted, accordingly, it is possible to accelerate gasification.

Furthermore, since the impurities (such as sulfur compounds) in the gas prepared by the gasification furnace 50 are removed by the gas purifier 70, it is possible to produce hydrogen ($H_2$) with high purity from the gas.

In addition, since the carbon monoxide (CO) in the gas from which the impurities are removed is converted into the carbon dioxide ($CO_2$) by the $CO_2$ separation/recovery apparatus 75 so as to be subjected to separation, only the hydrogen ($H_2$) can be extracted from the gas. At that time, the separated carbon dioxide ($CO_2$) is transported to an underground or undersea gas field or the like via pipelines and the like so as to be injected in the gas field strata. Therefore, when the carbon dioxide ($CO_2$) is generated at the time of producing the hydrogen ($H_2$) from the fine pulverized coal 48, it is possible to discharge substantially no carbon dioxide ($CO_2$).

Also, since the extracted hydrogen ($H_2$) is liquefied by the hydrogen liquefier 79 so as to be stored, as the liquid hydrogen ($LH_2$) having high volume efficiency, in the liquid hydrogen tank (mining site) 80. Thus, it is possible to store the hydrogen ($H_2$) in relatively small equipment.

Also, the liquid hydrogen ($LH_2$) stored in the liquid hydrogen tank (mining site) 80 is transported by the liquid hydrogen tanker 85 to another country where the transported hydrogen is used. Thus, it is possible to Japan, for example, as a country where the transported hydrogen is used, to produce fuel cells and the like with low costs.

In this embodiment, the lignite is fed and stored in the reduced-pressure fermentation dryer 3. However, the reduced-pressure fermentation dryer 3 as a drying apparatus of porous material may store, apart from the lignite, water-containing activated carbon or coffee grounds as porous material to be dried. When the reduced-pressure fermentation dryer 3 is used to dry water-containing activated carbon, it is not necessary to use a combustion apparatus for recycling.

Also in this embodiment, the gasification furnace 50 of the hydrogen production system 1 has an entrained bed structure. However, the gasification furnace 50 may have another structure. For example, a gasification furnace having a fixed-bed structure may be used. In this type of gasification furnace, the fine pulverized coal 48 is fed from the upper end part thereof while the oxidizing agent such as oxygen is supplied from the lower end part thereof. Alternatively, a gasification furnace having a fluidized bed structure may be used. In this type of gasification furnace, the fine pulverized coal 48 is fluidized by the air or the like so as to be gasified.

The foregoing embodiment is to be considered in all respects as illustrative and not limiting. The scope of the invention is indicated by the appended claims rather than by the foregoing embodiment, and all modifications and changes that come within the meaning and range of equivalency of the claims are intended to be embraced therein.

INDUSTRIAL APPLICABILITY

The present invention is suitably applied to a drying apparatus of porous material, a hydrogen production system including the drying apparatus, and a method for drying porous material.

DESCRIPTION OF REFERENCE NUMERALS

1 Hydrogen production system
3 Reduced-pressure fermentation dryer
30 Tank (airtight container)
40 Lignite (porous material)
48 Fine pulverized coal
50 Gasification furnace (gasifier)
70 Gas purifier
75 $CO_2$ separation/recovery apparatus (carbon dioxide separation apparatus)
79 Hydrogen liquefier
80 Liquid hydrogen tank (mining site) (storage equipment)
85 Liquid hydrogen tanker (transportation)

The invention claimed is:

1. A hydrogen production system comprising:
a drying apparatus of porous material, the drying apparatus including a reduced-pressure fermentation dryer configured to:
store lignite as porous material containing water in an airtight container;
heat and stir the lignite under reduced pressure so that a temperature of the lignite is within a predetermined temperature range;
feed microorganisms into the airtight container so that the microorganisms enter pores of the lignite; and
evaporate the water contained in the lignite by fermentation heat by the microorganisms so as to dry the lignite; and
a gasifier that gasifies the lignite dried by the reduced-pressure fermentation dryer of the drying apparatus so as to generate gas containing carbon monoxide and hydrogen as main components,
wherein, in a reduced-pressure fermentation drying process by the reduced-pressure fermentation dryer,
fermentation by the microorganisms passing through the pores of the lignite under the reduced pressure and drying of the lignite to its central part by the fermentation heat by the microorganisms are performed until the fermentation by the microorganisms is stopped due to a dried state of the lignite, and
the lignite that is dried and brittle is pulverized by being stirred under the reduced pressure maintained in the airtight container until the lignite becomes a state of fine pulverized coal having a particle diameter of not more than 0.1 mm, and
wherein the fine pulverized coal obtained by the reduced-pressure fermentation dryer is supplied to the gasifier so as to generate gas containing carbon monoxide and hydrogen as main components.

2. The hydrogen production system according to claim 1, further comprising a gas purifier that removes impurities contained in the gas generated by the gasifier.

3. The hydrogen production system according to claim 2, further comprising a carbon dioxide separation apparatus that generates carbon dioxide by a shift reaction of the carbon monoxide in the gas from which the impurities are removed by the gas purifier so as to separate the carbon dioxide from the hydrogen.

4. The hydrogen production system according to claim 3, further comprising storage equipment that stores liquid hydrogen obtained by liquefying the hydrogen separated from the carbon dioxide by the carbon dioxide separation apparatus.

5. The hydrogen production system according to claim 4, further comprising transportation to transport the liquid hydrogen stored in the storage equipment to a predetermined site.

6. The hydrogen production system according to claim 3, wherein
the carbon dioxide separated by the carbon dioxide separation apparatus is injected in underground strata or undersea strata.

7. A system for producing hydrogen using a hydrogen production system comprising:
   a drying apparatus of porous material, the drying apparatus including a reduced-pressure fermentation dryer configured to:
   store lignite as porous material containing water in an airtight container;
   heat and stir the lignite under reduced pressure so that a temperature of the lignite is within a predetermined temperature range;
   feed microorganisms into the airtight container so that the microorganisms enter pores of the lignite; and
   evaporate the water contained in the lignite by fermentation heat by the microorganisms so as to dry the lignite; and
   a gasifier that gasifies the lignite dried by the reduced-pressure fermentation dryer of the drying apparatus so as to generate gas containing carbon monoxide and hydrogen as main components,
   wherein, in a reduced-pressure fermentation drying process by the reduced-pressure fermentation dryer,
   a fermentation by the microorganisms passing through the pores of the lignite under the reduced pressure and drying of the lignite to its central part by the fermentation heat by the microorganisms are performed until the fermentation by the microorganisms is stopped due to a dried state of the lignite, and
   the lignite that is dried and brittle is pulverized by being stirred under the reduced pressure maintained in the airtight container until the lignite becomes a state of fine pulverized coal having a particle diameter of not more than 0.1 mm, and
   wherein the fine pulverized coal obtained by the reduced-pressure fermentation dryer is subsequently supplied to the gasifier so as to generate gas containing carbon monoxide and hydrogen as main components.

* * * * *